S. SUNDERLAND.
GEAR CUTTING MACHINE.
APPLICATION FILED JAN. 27, 1913.
1,187,200.
Patented June 13, 1916.
7 SHEETS—SHEET 1.
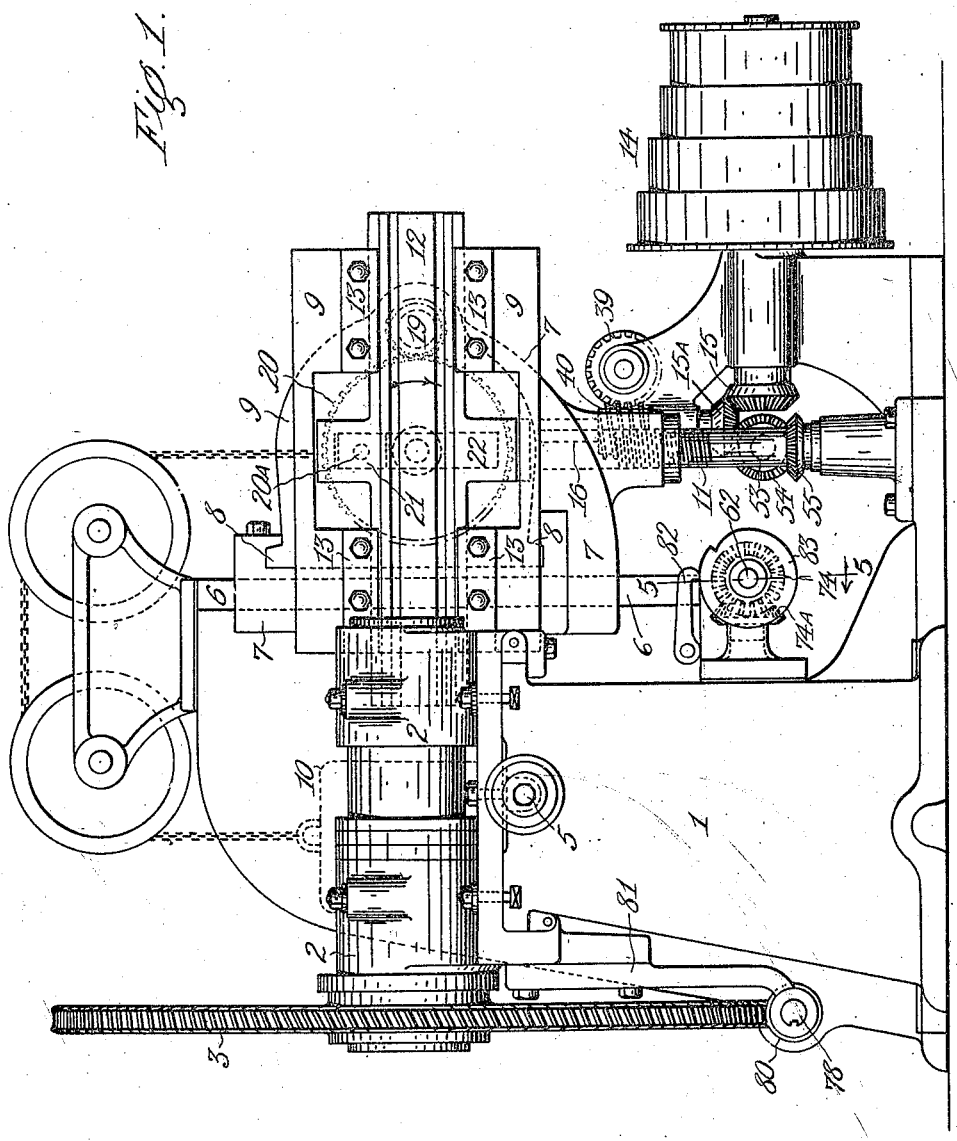
Witnesses.
C. E. Parsons
Ewd L. Tolson
Inventor:—
Sam Sunderland
By Shear, Nuddleton, Donaldson & Spear
Atty's

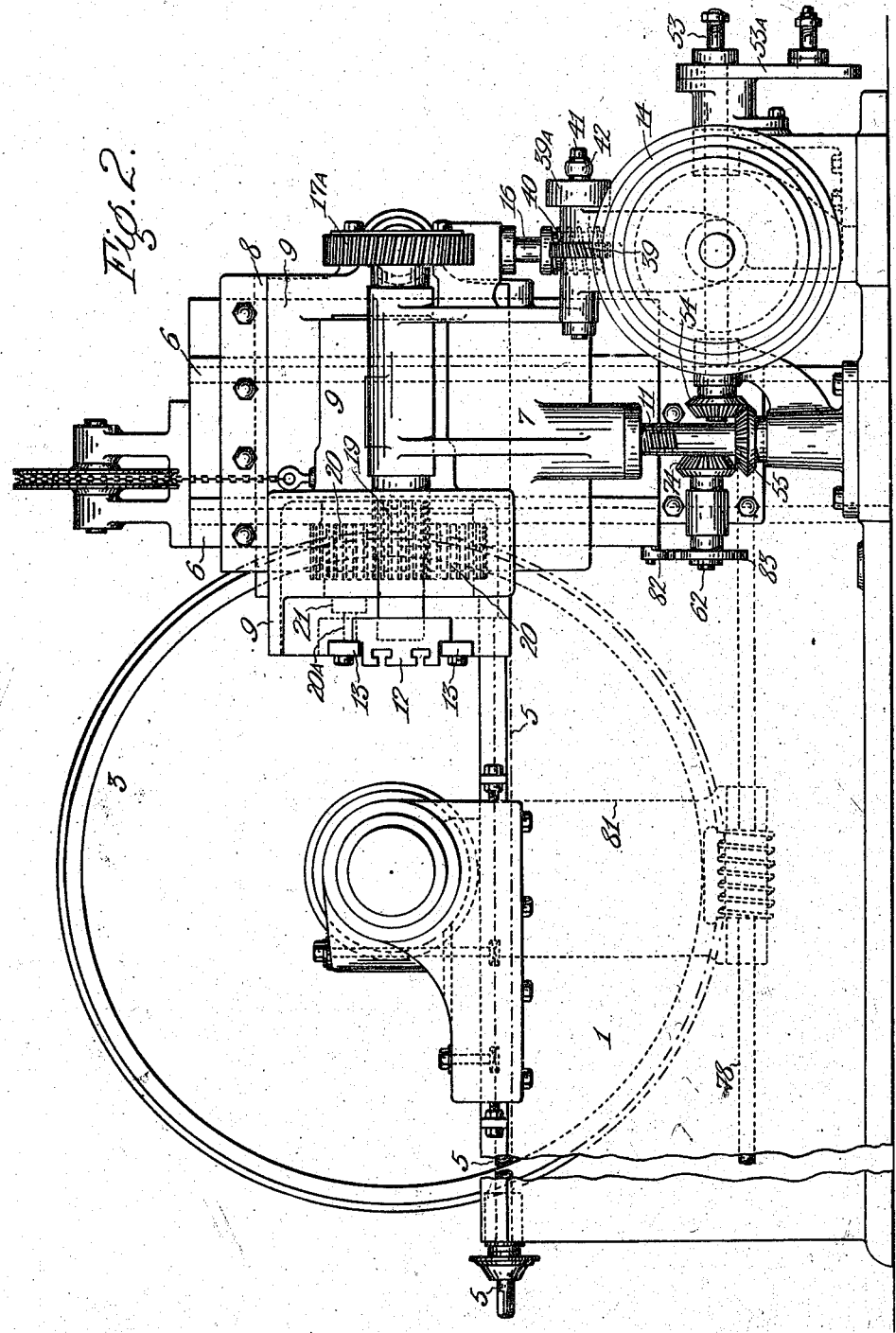

S. SUNDERLAND.
GEAR CUTTING MACHINE.
APPLICATION FILED JAN. 27, 1913.
1,187,200.
Patented June 13, 1916.
7 SHEETS—SHEET 3.
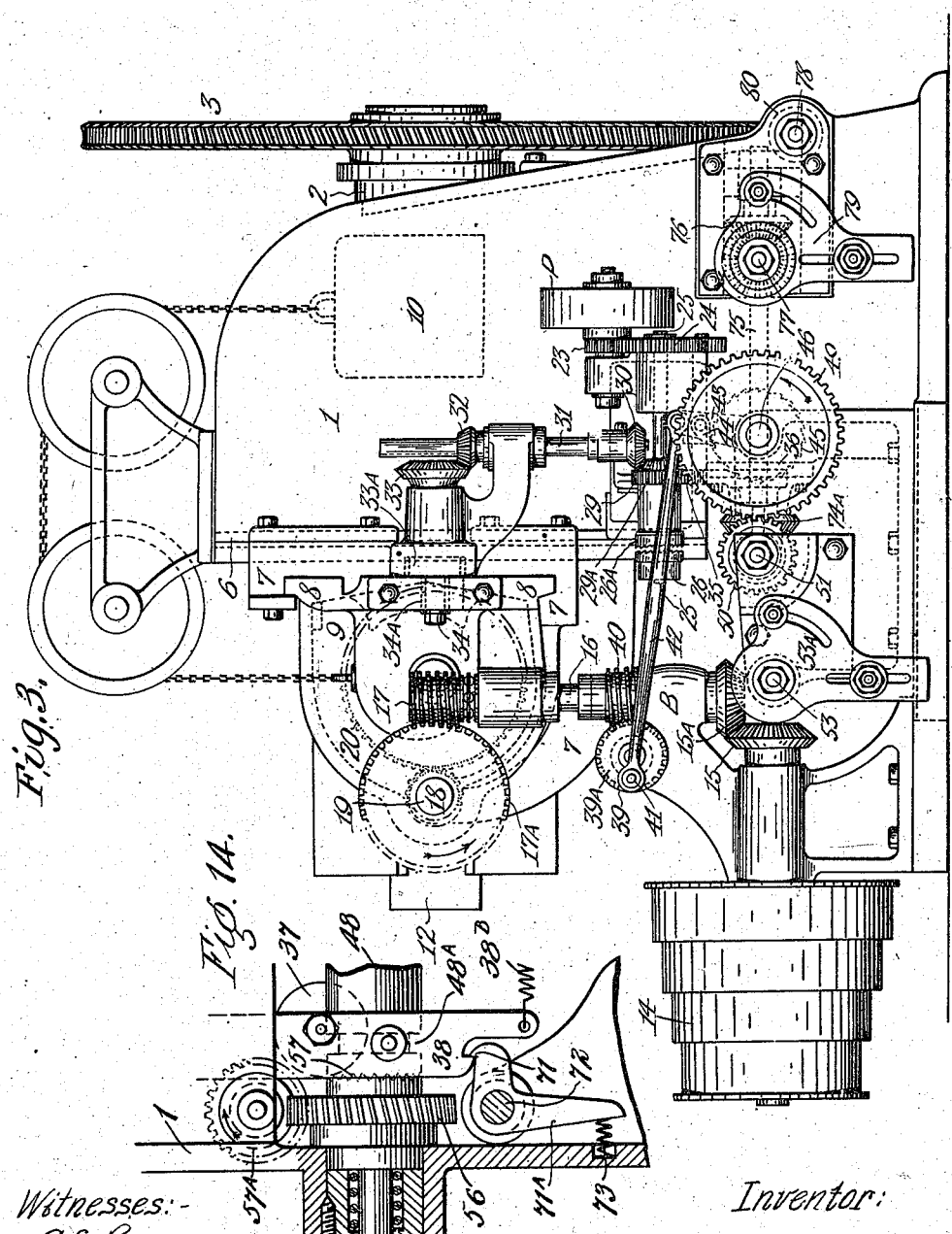

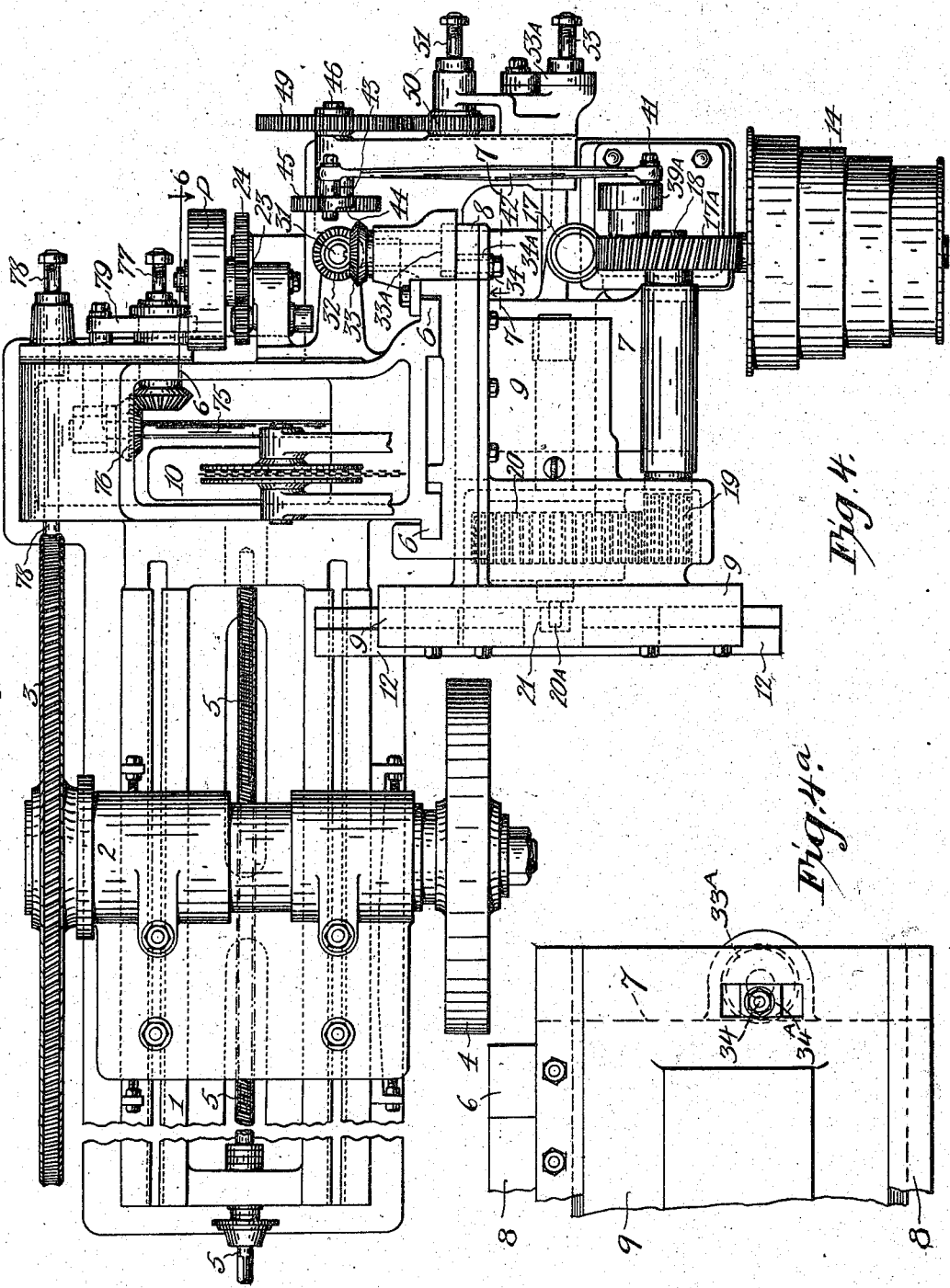

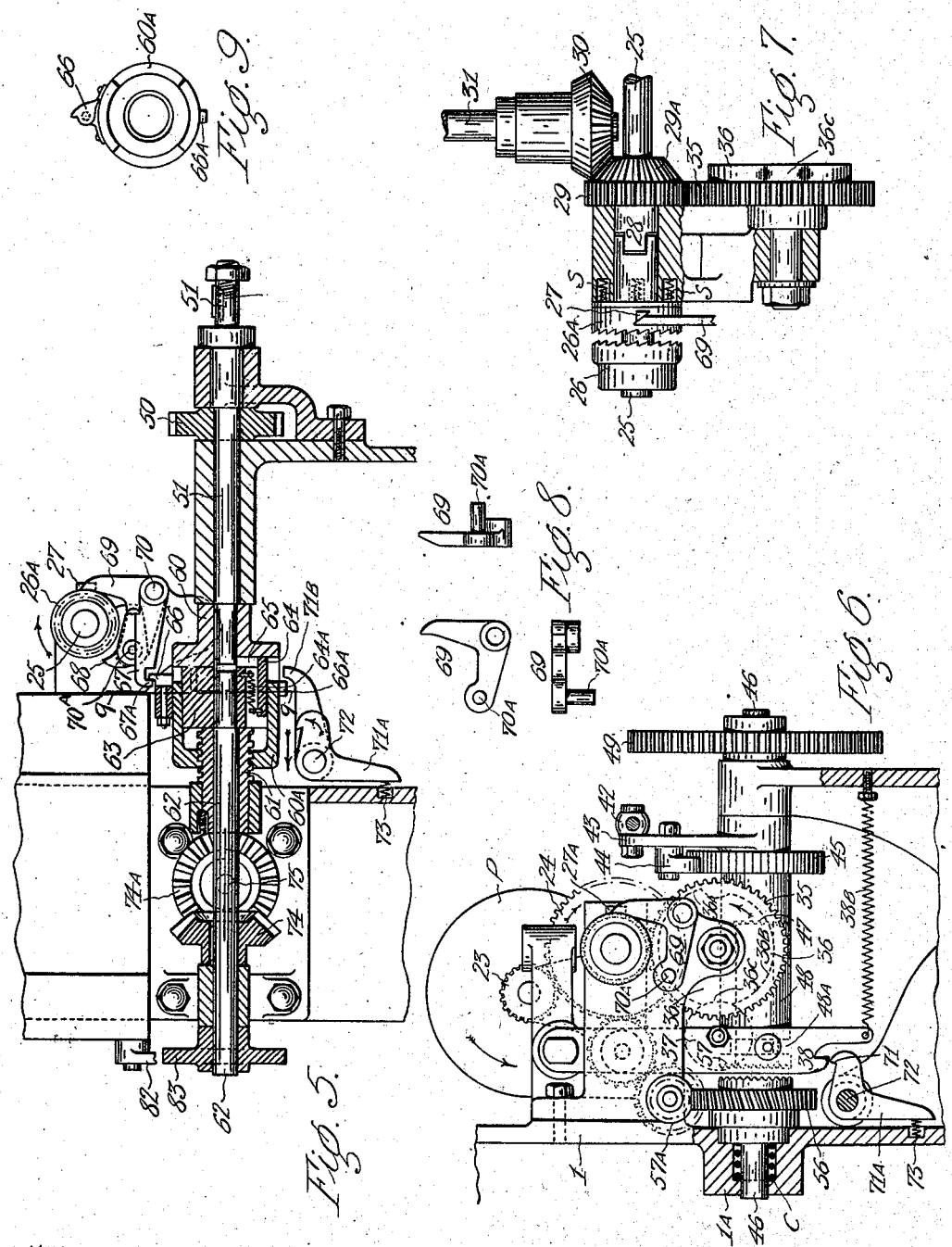

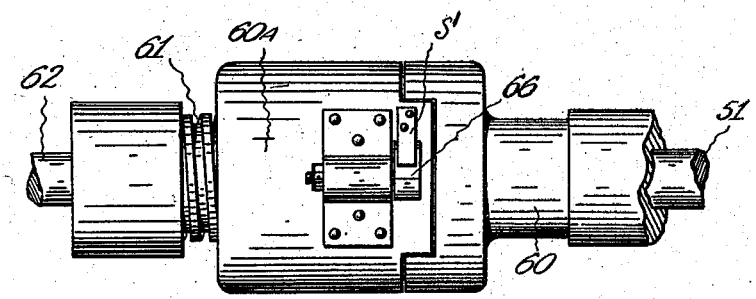
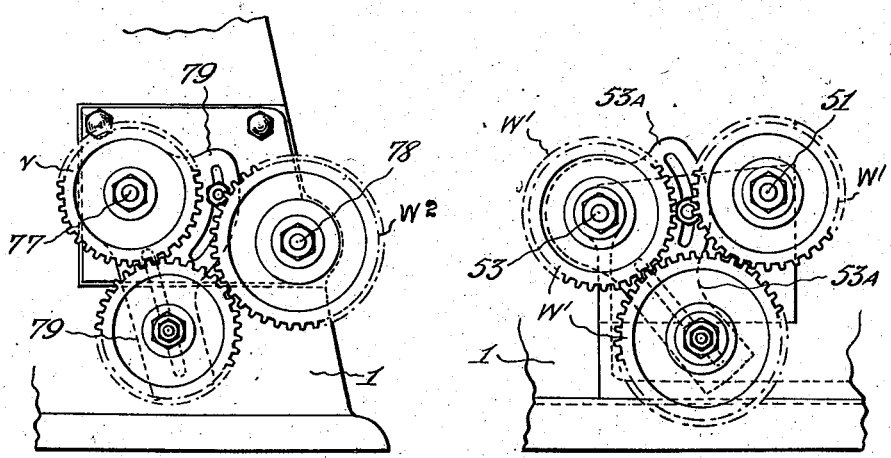
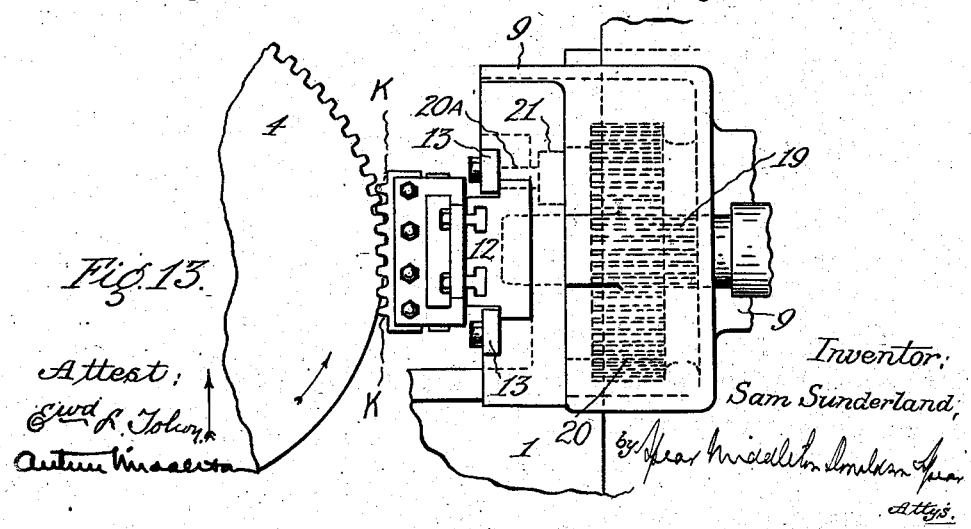

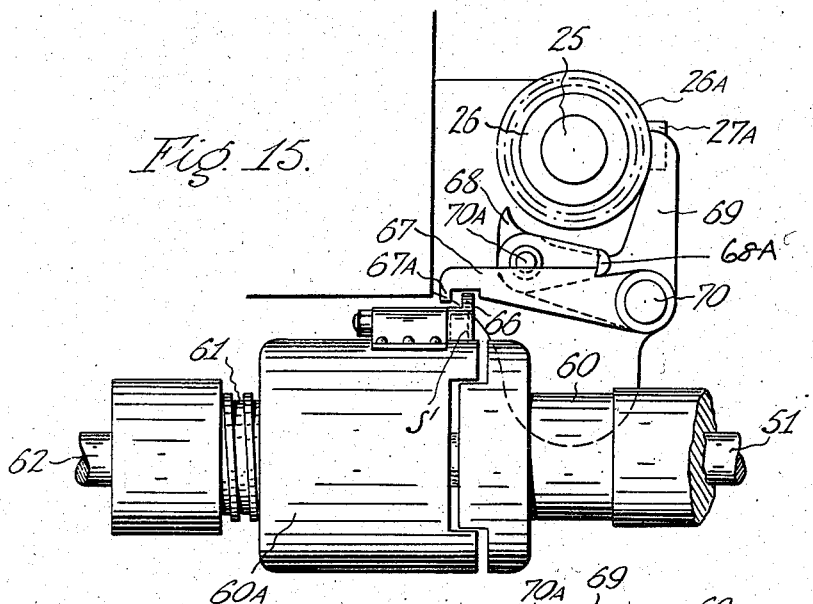
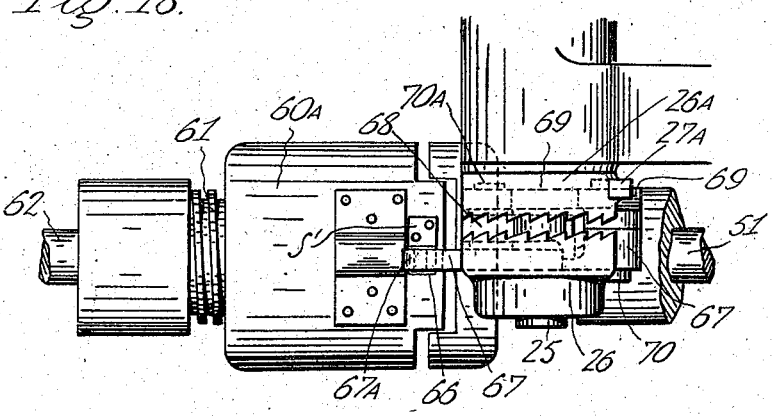

UNITED STATES PATENT OFFICE.

SAM SUNDERLAND, OF KEIGHLEY, ENGLAND.

GEAR-CUTTING MACHINE.

1,187,200.  Specification of Letters Patent.  Patented June 13, 1916.

Application filed January 27, 1913. Serial No. 744,501.

*To all whom it may concern:*

Be it known that I, SAM SUNDERLAND, a subject of the King of Great Britain and Ireland, and resident of High Utley, Keighley, in the county of York, England, have invented a new and useful Improvement in and Relating to Gear-Cutting Machines, of which the following is a specification.

This invention relates to spur gear cutting machines, and its object is to arrange and adapt mechanism for operating the reciprocating cutter slide horizontally and vertically, and when raised to the extent of its vertical movement, for the cutter attached to the reciprocating slide to recede out of engagement with the wheel blank, so that the cutter may be lowered; also to remove all backlash from the gears actuating the vertical movement of said slide and cutter, before the cutter is slid into engagement with the wheel blank, and to rotate the spacing or dividing wheel and blank during the cutting of the wheel teeth in an effective manner.

In describing my invention in detail, reference is made to the accompanying drawings, in which—

Figure 1 represents the front elevation of a gear cutting machine to which my invention is added. Fig. 2 is a side elevation. Fig. 3, a back elevation. Fig. 4, a plan of the machine. Fig. 4ª is a fragmentary elevation on the line 7—7 of Fig. 4 looking in the direction of the arrows. Fig. 5 is an enlarged sectional detail of a clutch mechanism, taken on the vertical line 5—5 of Fig. 1. Fig. 6 is an enlarged detailed view with parts in section; the line 6—6 and arrows in Fig. 4 indicate the location of this view in the organized machine. Fig. 7 is a detail of the sliding clutch shown by Fig 3, drawn to a larger scale and being shown in elevation with parts in cross section. Fig. 8 represents details of a lever 69, seen in side, end elevation and plan views respectively. Fig. 9 is a detail taken on line 9—9 on Fig. 5. Fig. 10 is an enlarged plan view of a part of the clutch mechanism shown in Fig. 5; Fig. 11 is a detail view showing the change wheels W and W² on shafts 77 and 78 and their intermediate gearing; Fig. 12 is a detail showing the change wheels W', W' on shafts 51, and 53 and their intermediate gearing; Fig. 13 is an enlarged detail showing the head stock carrying the cutter with the latter in operative engagement with a wheel blank; Fig. 14 is an enlarged detail of the release latch and clutch mechanism shown in Fig. 6; Fig. 15 is an enlarged detached detail of the levers and mechanism utilized for controlling the sliding and vertical movements of head stock; Fig. 16 is a plan of same. Fig. 17 is a plan of the before mentioned levers. Fig. 18 is a detached view of one of the levers.

In carrying out my invention, a gauntree 1 is formed upon which is placed a saddle 2, provided with a mandrel of the ordinary description, to one end of which is secured what is generally termed the spacing or dividing wheel 3, the opposite end of the mandrel being suitably adapted to support wheel blanks. A screw 5 engages with a threaded nut of the saddle, so that on rotating the screw, the saddle may be moved to the position to suit the diameter of wheel blank 4, such as shown by plan view. Vertical guide ways 6 form part of the gauntree, and engaging with these guide ways is a plate bracket 7, said plate being provided with horizontal guide ways 8, in which is mounted the headstock 9, said bracket and headstock being to some extent counter-balanced in a convenient manner, such as by a weight 10 as shown.

The bracket and headstock are controlled in their vertical movements by a threaded bar 11 made to revolve in both directions, slowly when the plate bracket and headstock are rising, and more quickly when lowering; the headstock along with the reciprocating slide 12, and cutter K, being slid toward the wheel blank for cutting the teeth, and withdrawn therefrom for allowing the headstock and cutter to descend.

The reciprocating plate 12, to which a cutter K of the usual description is attached, is mounted in guideways 13 formed in the front plate of headstock 9, said plate and attached cutter being reciprocated by geared connections with the step pulley 14, through bevel wheels 15 and 15ᴬ, vertical shaft 16, worm 17 and worm wheel 17ᴬ, see Fig. 3.

Upon shaft 16, is feather keyed the hub of bevel wheel 15ᴬ, said hub passing through boss B, and to the upper portion of the hub is keyed a worm 40. The worm 17 is by preference integral with shaft 16, said worm gearing with worm wheel 17ᴬ keyed to one end of shaft 18, mounted in a suitable bearing formed on plate bracket 7. At the opposite end of shaft 18, a long toothed pinion 19 is formed, see Figs. 2 and 13, and is geared with a spur wheel 20, from the face of which projects a stud 20^A, carrying a block 21 engaging with the vertical slot 22 formed in plate 12, see Fig. 1, so that on the rotation of wheel 20, plate 12 is reciprocated along with the attached cutter K.

The saddle 2 is adapted to slide upon the gauntree 1 to which it is bolted in the position to suit the diameter of wheel blank 4. The headstock 9 carrying the reciprocating plate and attached cutter K of the rack type, is moved in the horizontal guide ways 8 formed in the plate bracket 7 toward and away from the wheel blank 4. When the headstock 9 is in the forward position for the cutter K to engage with and cut the teeth in wheel blank 4 the headstock 9 along with the reciprocating cutter K are moving upward and during such movement, the dividing wheel 3 is causing the blank 4 to be rotated in the direction corresponding to the upward movement of said cutter, the rate of rotation of blank 4 at what is known as the pitch line of the teeth being cut, is the same as the upward movement of the headstock 9 and cutter K.

When the headstock 9 and reciprocating cutter K, have been raised to the desired height, they are slid backward in the guide ways 8, a distance for the cutter to be clear of blank 4. During such clearance the headstock 9 is lowered by the reversal of rotation of the threaded bar 11, operated as hereinafter described.

The rotary motion controlling the sliding of headstock 9, and the starting, stopping and extent of the vertical movement of said headstock, also the rotation of the divided wheel 3, and wheel blank, is obtained from a source independent of step pulley 14.

Upon a fixed stud is mounted a rotating pulley P, attached to a spur wheel 23, said wheel gearing with a wheel 24 keyed to one end of shaft 25, to the opposite end of which is secured a toothed clutch 26, with which the sliding clutch 26^A,—free on shaft 25,— is allowed to engage periodically, the last named clutch being provided with an angular projecting stop piece 27, see Fig. 7.

The sleeve of clutch 26^A engages with the sleeve 28 of spur wheel 29 which is attached to bevel wheel 29^A, the bevel wheel gearing with a like wheel 30 keyed upon the vertical shaft 31, to the upper portion of which is feather keyed a bevel pinion 32 gearing with bevel wheel 33 of double the diameter of pinion 32. This bevel wheel 33 is keyed upon a horizontal shaft suitably supported, and to the opposite end of said shaft, is secured a disk plate 33^A, see Figs. 3 and 4, from the face of which projects a crank pin 34, said pin supporting a block 34^A, placed within a vertical slot formed in the rear portion of headstock 9, mounted in the horizontal guide ways 8 of plate bracket 7.

Each time the freely mounted sliding clutch 26^A is allowed to engage with the continuously rotating clutch 26, the spur and attached bevel wheel 29 and 29^A, make one revolution, and the bevel wheel 33, horizontal shaft and crank pin 34, one half of a revolution, thereby causing the headstock 9, the reciprocating plate, and the attached cutter K, to advance toward or recede from the wheel blank on each half revolution of crank pin 34.

The controlling of the engagement and disengagement of the clutches 26 and 26^A, is effected by the operation of the levers 67, 68 and 69, shown by Figs. 5 and 8. These levers are not shown by Fig. 3, in order to more clearly illustrate the location of the clutch mechanism behind, hereinafter referred to.

The worm wheel 39, see Figs. 2 and 3, is rotated by worm 40, and on the shaft of said worm wheel is keyed a disk 39^A, provided with a crank pin 41. Upon said pin is mounted one end of connecting rod 42, the other end of which rod is carried by a pin projecting from lever 43, said lever being provided with a pawl 44, adapted to engage with the teeth of ratchet wheel 45, freely mounted on shaft 46, supported by the machine frame, see Figs. 3 and 6.

The end of ratchet wheel boss at 47, see Fig. 6, is cut with clutch teeth, and upon shaft 46, is feather keyed a sliding sleeve 48, cut with clutch teeth at both ends. Keyed upon shaft 46 is a spur wheel 49, gearing with a wheel 50, which is of half the diameter of said wheel 49 and is secured to shaft 51, see Figs. 3 and 4, by which the change wheels W' shown by Fig. 12, are rotated.

The wheel 50 is secured to end of shaft 51, and another of the change wheels W' secured to the end of shaft 53, the intermediate change wheel being carried by an ordinary stud plate 53^A, in the usual manner. To the other end of shaft 53 is keyed a bevel wheel 54 geared with a bevel wheel 55, secured on the vertical threaded bar 11, see Figs. 1 and 2. By the rotation of these wheels, first in one direction and then in the other, the vertical sliding movements of the headstock and cutter are effected in accordance with the composition of the said change wheels.

Upon the inner end of shaft 46, see Figs. 6 and 14, is freely mounted a worm wheel 56 rotated by worm 57^A, operated by the intermediate spur wheels gearing with the constantly rotating spur wheel 23 actuated by pulley P. The boss on one side of worm wheel 56 is provided with clutch teeth, the other boss of wheel extends into a recess formed in the outward swell 1^A of gauntree; in this recess is a spiral spring C encircling shaft 46, and in contact with the wheel boss and end of recess as shown. This spring acts as a cushion when the clutch teeth at 57 are brought into gear.

The operation of levers 67, 68 and bell crank lever 69 controls the reversible motions of the threaded bar 11, headstock 9 and other portions of the machine.

Bell crank lever 69 is supported by a fixed stud 70, see Fig. 5, and upon stud 70$^A$ projecting from bell crank lever a lever 68 is mounted, provided with a hook 68$^A$ at one end adapted to engage with a notch cut in the top side of lever 67, in a manner so as to retain said lever in its raised position as shown by Figs. 5, 15 and 17, the periodic raising of lever 67 being effected on the curved side of tappet 66 engaging with the lever.

When lever 67 is raised by pivoted tappet 66, Figs. 5, 9 and 10, the clutch 26$^A$ is allowed to slide into gear with the constantly rotating clutch 26, turning spur wheel 29 and bevel wheel 29$^A$, one revolution, and by wheel 29 gearing with spur wheel 35 of double diameter, said spur wheel and attached circular cam 36 make one half of a revolution; vertical shaft 31 makes one revolution, disk plate 33$^A$ one half of a revolution and the headstock 9 is caused to slide horizontally a distance sufficient to withdraw the cutter K from, or to engage with blank 4.

The rotation of circular cam 36, one half of a revolution each time it is put in motion, controls the swinging pendulum lever 38, which is suitably engaged with groove 48$^A$ formed in sliding sleeve 48, feather keyed on shaft 46, and provided with clutch teeth at both ends, see Fig. 6.

When the roller 37, supported by pendulum lever 38, is engaged with the indent 36$^C$ as shown by Fig. 6, the clutch teeth at 47 are in gear with those on the boss of ratchet wheel 45 freely mounted on shaft 46, on which spur wheel 49 is secured. So long as these teeth at 47 are in gear, shaft 46 and spur wheel 49 are operated, and the threaded bar 11 rotated in the direction for raising headstock 9, for removing any back lash from the geared wheels operating threaded bar 11, before each series of cuttings commence, and during the cutting of the teeth.

The control of the sliding clutch 26$^A$ is effected in the manner as hereinbefore described, and on said clutch again engaging with the constantly rotating clutch 26, spur wheel 35 and circular cam 36 make another half of a revolution, causing the surface 36$^A$ of circular cam—which is at the greatest distance from the center of cam,— to engage with roller 37 and force pendulum lever 38 a sufficient distance from the center of cam to cause the clutch teeth at 47 to disengage, and those at the opposite end of sliding sleeve 48, to be brought into gear with those of the rotating worm wheel 56, where they are retained for a short period by the hooked catch 71 of lever 71$^A$ secured on shaft 72, said catches being forced into engagement by the expansion of compressed spring 73 mounted near the bottom of lever 71$^A$, see Fig. 14. During such engagement of the hooked catches, the rotation of shaft 46 and threaded bar 11 are reversed and the speed accelerated by worm wheel 56, thereby quickly lowering the headstock 9 and reciprocating cutter K, which is then clear of blank.

When the rotation of shaft 46 and geared connections are reversed as last indicated for lowering the headstock, the clutch 60$^A$ is sliding in the opposite direction to that shown by the straight arrow in Fig. 5, and on the projection 66$^A$ of said clutch engaging with and depressing the end of lever 71$^B$ secured on shaft 72, the catches at 71 are disengaged and pendulum lever 38 liberated, allowing spiral spring 38$^B$ to contract and operate said lever and therefore sliding sleeve 48, so that the clutch teeth at 47 are brought into gear, by which the rotation of threaded bar 11 is reversed for a period sufficiently long to remove any back lash there may be in the toothed wheels 49 and threaded bar 11, before the cutter K engages with the wheel blank L. When the pendulum lever is thus liberated, roller 37 then engages with the indent adjoining 36$^A$ of circular cam 36, and on the sliding clutch 26$^A$ and spur wheel 29 making another revolution on the operation of levers 67, 68 and 69, the circular cam 36 is rotated one half of a revolution, the roller 37 passing over the circular path 36$^B$, which is sufficiently prominent to withdraw the clutch teeth at 47 out of gear. During this disengagement of the clutch teeth at 47, the vertical shaft 31 makes one revolution, and crank pin 34 one half of a revolution in the direction to advance the headstock to the position for the cutter K to engage with the wheel blank, and on arriving in that position, the circular cam 36 will be in the position to allow roller 37 to engage with indent 36$^C$, allowing clutch teeth at 47 to engage and the headstock and reciprocating cutter to be raised a distance equal to the pitch of the gear being cut in blank 4, and on the headstock arriving at the top of its vertical movement, the before mentioned operations are repeated.

The shaft 51 is rotated by wheel 50 gearing with wheel 49, and keyed to the inner end of shaft 51, see Fig. 5, is a clutch 60 provided with longitudinal projections and recesses of the ordinary construction, similar to those at 28, shown by Fig. 7. These projections engage with corresponding recesses formed in the clutch 60$^A$, which is mounted upon a threaded boss 61, rigidly secured to the machine frame. Through this threaded boss is freely passed a shaft 62, upon which is keyed a circular block 63 provided with a latch ended yielding bar 64, so adapted, that when shaft 51 is rotating in one direction during the cutting of the teeth, shaft 62 is also rotated. This is effected by the straight side of latch ended bar 64 engaging with the radial groove 65, the shaft 62 rotating bevel wheels 74 and 74ᴬ, and through the intermediate connections the dividing wheel 3, during the period the cutter K is acting on the wheel blank 4, and clutch 60ᴬ sliding in the direction of straight arrow in Fig. 5. When the rotating clutch 60ᴬ arrives at the end of its movement in the direction indicated by the arrow in Fig. 5, the tappet 66 engages with 67ᴬ of lever 67 raising said lever, and operating levers 68 and 69 thereby allowing sliding clutch 26ᴬ to rotate one revolution, and circular cam 36, Fig. 6 one half of a revolution, by which operation the clutch teeth 47 at one end of sleeve 48 are disengaged, and those at the opposite end of sleeve slide into mesh with the clutch teeth of worm wheel 56 thereby reversing the rotation of shaft 51; causing the angular side of latch ended bar 64 to engage with the radial groove 65 cut in clutch 60, the angular side of bar allowing it to yield in the direction of straight arrow leaving shaft 62 stationary, during which the threaded bar 11 is rotated in the direction for lowering the headstock 9 and cutter K, the latter being then clear of wheel blank 4.

Lever 67 and bell crank lever 69 are both freely mounted on rigid stud 70, and when the notched end of lever 67 is raised as described, lever 68 is also raised, and being supported on pin 70ᴬ of bell crank lever 69, the other arm of bell crank lever is forced clear of the circumference of sliding clutch 26ᴬ and angular stop 27, thus liberating said clutch so that on the expansion of compressed springs S, see Fig. 7, the clutch is forced into gear with the constantly rotating clutch 26 for one revolution; this takes place each time lever 67 is raised.

On the angular projecting stop 27 coming in contact with the curvature at the upper portion of lever 68, the catch at the lower and free end of said lever, is raised clear of lever 67, liberating same, allowing it to descend and the upper end of bell crank lever 69 to fall into contact with the circumference of sliding clutch 26ᴬ, so that on it completing the revolution, and on the angular stop 27 engaging with the inclined end of bell crank lever 69, see Fig. 7, the sliding clutch 26ᴬ is moved clear of the constantly rotating clutch 26.

On each rotation of sliding clutch 26ᴬ the bell crank lever 69 liberates the stop piece 27 so that the clutch 60ᴬ will travel a predetermined distance in one or the other direction, and at the termination of each movement the tappet 66 will have engaged with the lever 67 for the purpose of controlling the rotation of clutch 26ᴬ as before mentioned, the tappet passing through the indent in lever 67 without affecting its position.

While the pivoted tappet 66 is passing through said indent, the headstock 9 is rising and the reciprocating cutter K engaging with the wheel blank 4, but on the tappet engaging with the end portion 67ᴬ of lever 67, bell crank lever 69 is operated and sliding clutch 26ᴬ liberated as before described, allowing said clutch to make one revolution. During this revolution, shaft 51 is reversed, clutch 60ᴬ slid in the opposite direction to that shown by straight arrow, vertical shaft 31 is also rotated and the cutter moved clear of blank 4, at the same time the clutch teeth at 57 are brought into gear with the worm wheel 56 as shown by Fig. 14, causing the headstock to be lowered quickly.

The lowering of headstock 9 is stopped on the meshing of the clutch teeth at 47, by which the rotation of sleeve 48 is reversed. The clutch 60ᴬ is then moved in the direction opposite to that shown by the straight arrow in Fig. 5, and since as previously stated tappet 66 is adapted to pass through the indent in lever 67 it is not raised during this operation. On the projection 66ᴬ engaging with end of lever 71ᴮ, the catch 71 liberates pendulum lever 38, causing the clutch teeth at 47 to mesh as before described.

By means of the latch ended bar arranged and operated in the manner described, an intermittent rotary motion in one direction only is given to shaft 62, upon which is keyed a bevel wheel 74 gearing with a like wheel 74ᴬ secured on shaft 75, see Figs. 1 and 5, and upon the opposite end of said shaft is keyed another bevel wheel 76 gearing with a like wheel secured on shaft 77, see Fig. 4. To the end of this shaft is secured a change wheel W gearing through a like intermediate wheel carried by an ordinary stud plate 79, with the wheel W² secured on shaft 78, see Fig. 11, said shaft operating dividing wheel 3.

Shaft 78 is grooved for the greater part of its length, and feather keyed thereon is a worm 80, placed within a forked recess formed between the shaft bearings of rigid arm 81, secured to saddle 2, the worm gearing with the dividing wheel 3 keyed on the mandrel passing through saddle 2, see Figs. 1 and 2.

The engagement of pawl 82 with the indent cut in disk 83, secured on shaft 62, prevents the rotation of said shaft other than when the dividing wheel 3 is operated during the cutting of the teeth in wheel blank.

The operation of the machine is as follows:—The wheel blank 4 mounted upon mandrel 2, is intermittently rotated at a speed equal to that of the rising cutter K, during the cutting of teeth in said blank. The reciprocation of said cutter is derived from step pulley 14, through bevel wheels 15 and 15ᴬ, vertical shaft 16, worm and worm wheel 17ᴬ, pinion 19 and spur wheel 20, provided with a stud 20ᴬ and block 21, the latter engaging with slot 22 in plate 12, so that on the rotation of spur wheel 20 and stud 21, plate 12 to which cutter K is suitably attached, is caused to reciprocate. The pulley P imparts motion to pinion 23, and other portions of the machine, said pinion gearing with spur wheel 24 secured on shaft 25 carrying clutch 26, is constantly rotated by said pulley. The spur wheel 24 through a train of gears and worms 57ᴬ, rotates worm wheel 56, provided with clutch teeth engaging periodically with like teeth 57 at one end of sliding sleeve 48. When these clutch teeth are in mesh, the headstock 9 and cutter K are lowered quickly, the cutter K being then clear of wheel blank.

The horizontal sliding movement of headstock 9 and cutter K, is effected in each direction on the engagement of the sliding clutch 26ᴬ with the fixed and constantly rotating clutch 26. When these clutches are in mesh, clutch 26ᴬ is allowed to make one revolution only and operate spur wheel 29 and bevel wheel 29ᴬ in like manner. The bevel wheel meshes with wheel 30, and operates through vertical shaft 31, and wheels 32 and 33, the disk plate 33ᴬ and pin 34, one half of a revolution, see Figs. 3 and 4, thereby causing the headstock and cutter to slide toward or away from the wheel blank.

The sliding clutch 26ᴬ is brought into mesh with 26, and rotated one revolution on each operation of levers 67, 68 and 69, and the rotation stopped on the engagement of angular projection 27 with end of bell crank lever 69, see Fig. 7. On each rotation of sliding clutch 26ᴬ and spur wheel 29, circular cam 36 makes one half of a revolution causing pendulum lever 38 to swing on its supporting stud, and slide sleeve 48 in one direction or the other. When the clutch teeth at 47 are in mesh, the headstock 9 and cutter K are raised by the rotation of threaded bar 11, operated through spur wheels 49 and 50, and change wheels W¹ shown by Fig. 12. When the threaded bar is thus rotated, the reciprocating cutter K is acting on the teeth of wheel blank 4, but on the levers 67, 68 and 69, being again operated, circular cam 36 is rotated another half revolution, and sleeve 48 slid so that the clutch teeth at 57 are in mesh, by which the headstock and cutter are lowered on the reversal of rotation of shaft 46 and gears connected with threaded bar 11. When these are lowered the desired distance, pendulum lever 38 is released on the withdrawal of catch 71, Fig. 14, from engagement with said lever, allowing spring 38ᴮ to contract and cause sleeve 48 to slide in the direction to bring the clutch teeth at 47 into mesh.

The operation of levers 67, 68 and 69, and the rotation of cam 36, is controlled by the position of lever 67, when it is raised by pivoted tappet 66 engaging with the underside of lever, lever 68 engaging with lever 67 as shown by Fig. 5 is also raised, and being pivoted at 70ᴬ to one arm of bell crank lever 69, the other arm of said lever is moved clear of stop piece 27, thereby allowing clutch 26ᴬ to slide into mesh with clutch 26 for one revolution and rotate the connected wheels.

The clutch 60ᴬ carrying tappet 66 is moved to the right and left in accordance with the rising and lowering of the headstock 9, the said tappet on engagement with lever 67 raising same, and thereby liberating clutch 26ᴬ to slide into mesh with the rotating clutch 26, allowing clutch 26ᴬ to make one revolution on each raising of lever 67, the indent cut in the underside of said lever allowing the tappet as it revolves to pass through same without affecting the position of lever.

What I claim is:—

1. A gear planing and generating machine, comprising in combination an adjustable saddle plate, a spindle thereon adapted to carry a wheel blank, a movable headstock, a non-rotating reciprocating cutter carried thereon, means for adjusting said saddle plate to a fixed position, means for moving said headstock horizontally toward and away from the wheel blank, means for raising and lowering said headstock vertically, means for rotating said spindle intermittently and means for reciprocating said cutter horizontally in the headstock.

2. A gear planing and generating machine comprising in combination an adjustable saddle plate, a rotatable spindle thereon adapted to carry a wheel blank, a movable headstock, a reciprocating non-rotating cutter carried thereby, means for imparting a reciprocating motion to said cutter, means for slowly raising said heastock vertically, means for causing said means to automatically reverse and thereby rapidly lower said headstock, means coöperating with said raising and lowering means for moving said headstock horizontally toward and away from said wheel blank, means for holding said saddle plate in a fixed position and means for intermittently rotating said wheel blank with its spindle simultaneously with the upward vertical movement of the headstock, substantially as described.

3. A gear planing and generating machine comprising in combination an adjustable saddle plate adapted to be set in a fixed position, an intermittently rotatable wheel blank supported thereon, a vertical threaded shaft, adapted to rotate in either direction, a headstock movable on said shaft, a reciprocating cutter carried by said headstock, means for rotating said threaded shaft slowly in one direction to cause the headstock to rise and means for rotating said shaft rapidly in the reverse direction to lower said headstock, an automatically operated sliding clutch for alternately connecting said shaft with one or the other of said means, means for causing the headstock to move horizontally toward and away from said wheel blank and means for imparting a rotating movement to said wheel blank simultaneously with the upward movement of said headstock, substantially as described.

In witness whereof, I have hereunto set my hand in the presence of two subscribing witnesses.

SAM SUNDERLAND.

Witnesses:
WM. ILLINGWORTH,
JOHN GILL.